Patented July 28, 1953

2,647,102

UNITED STATES PATENT OFFICE 2,647,102

AGE RESISTING NONSTAINING RUBBER COMPOSITION AND METHOD OF PRODUCING SAME

Joseph C. Ambelang, Akron, Ohio, assignor to The Firestone Tire & Rubber Company, Akron, Ohio, a corporation of Ohio No Drawing. Application July 1, 1950, Serial No. 171,761

10 Claims. (Cl. 260—45.95)

This invention relates to vulcanized, as well as unvulcanized but vulcanizable, rubber compositions resistant to deterioration normally attending aging of the compositions, whether by the action of heat, light, oxygen, ozone or any combination thereof. The invention includes the production of the improved rubber compositions by incorporating a new and improved class of non-staining antioxidants or stabilizers into a rubbery composition prior to vulcanization thereof. This application is a continuation-in-part of my copending application Serial No. 641,007, filed January 12, 1946, now abandoned.

The new antioxidants are prepared by reacting 3 to 4 moles of an aliphatic aldehyde with 6 moles of a dialkylphenol hvaing the following formula:

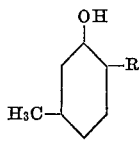

in which R is an alkyl radical containing 3 to 10, inclusive, carbon atoms.

The aldehydes which are used in preparing the new antioxidants are formaldehyde, acetaldehyde, crotonaldehyde, butyraldehyde, isobutyraldehyde, propionaldehyde, valeraldehyde, isovaleraldehyde, 2-ethyl-butyraldehyde, and similar low molecular weight aliphatic aldehydes.

The mono-alkyl m-cresols used in preparing the antioxidants of the invention are the 2-alkyl-5-methylphenols in which the alkyl radical is propyl, isoprppyl, n-butyl, isobutyl, tert-butyl, the various isomeric amyl radicals, the various isomeric hexyl radicals, the various isomeric heptyl radicals, the various isomeric octyl radicals, the various isomeric nonyl radicals and the various isomeric decyl radicals. In lieu of the alkyl radicals enumerated, substituted alkyl radicals, such as cyclohexyl, benzyl, $\alpha$-methylbenzyl, $\alpha,\alpha$-dimethylbenzyl, various nuclearly alkylated benzyl radicals, and homologs of the cyclohexyl radical are within the scope of the invention.

The dialkylphenol-aldehyde reaction appears to be a condensation reaction, and it may be accelerated by use of an acid or an alkali catalyst. It is important, however, to avoid using any substantial excess of the aldehyde over the proportion thereof set out above, in order to produce relatively low molecular weight reaction products and to avoid producing the high molecular weight condensates, as the latter are relatively poor antioxidants.

The following examples are illustrative of the preparation of the antioxidants of the invention.

EXAMPLE 1

Two moles (328 grams) of 2-tert-butyl-5-methylphenol with 0.45 mole (59.4 grams) of paraldehyde (equivalent to 1.35 moles acetaldehyde) and 60 ml. of hydrochloric acid (sp. gr. 1.19) were stirred under reflux on a steam bath for 4 hours. The reaction mixture was neutralized with sodium carbonate and the product taken up in a benzene-alcohol mixture. After removal of solvent, a crystalline reaction product remained, weighing 84% of the weight of the dialkylphenol. After recrystallization from benzene the reaction product melted at 201–202° C.

The acetaldehyde - butyl - m - cresol reaction product, so prepared, was tested as an antioxidant in the following tire white sidewall stock formula:

| Ingredients | Parts by Weight |
|---|---|
| Natural rubber (pale crepe) | 100 |
| Zinc oxide | 70 |
| Titanium dioxide pigment | 20 |
| Ultramarine blue | 0.2 |
| Stearic acid | 1.2 |
| Sulfur | 3 |
| Accelerator | 0.9 |
| Hydrocarbon wax | 2 |
| Antioxidant | 1 |

The test stock was mixed and vulcanized 60 minutes at 280° F., and then compared with a blank stock (identical with the test stock but containing no antioxidant) vulcanized under the same conditions. The comparative data are set out in Table 1.

TABLE 1

| Cured 60 min. at 280° F. | Blank Stock | Test Stock |
|---|---|---|
| Normal Properties: | | |
| Modulus at 400% elongation (p. s. i) | 1,000 | 1,100 |
| Tensile Strength at break (p. s. i.) | 3,550 | 3,650 |
| Elongation at break (percent) | 640 | 640 |
| Properties After Aging 2 Days in Oven at 212° F.: | | |
| Modulus at 400% elongation (p. s. i.) | 1,000 | 1,225 |
| Tensile Strength at break (p. s. i.) | 2,250 | 2,575 |
| Elongation at break (percent) | 540 | 550 |
| Retention of Tensile Strength (percent) | 63 | 71 |
| Oxygen Absorption Test[1]: Hours to absorb 5 ml. of oxygen | 15 | 58 |

[1] J. R. Shelton and Hugh Winn, Industrial and Engineering Chemistry, vol. 38, p. 71 (1946); ibid., vol. 40, p. 2081 (1948).

Table 1 shows that the antioxidant of Example 1 substantially protects natural rubber from oxidation and the effects of heat. The protection against absorption of oxygen gas is very pronounced. Also, it was observed that the antioxidant did not stain the white rubber stock in which it was tested, the test stock being as free from discoloration as the blank stock containing no antioxidant.

EXAMPLE 2

To a solution of 22 grams (0.1 mole) of 2-tert-octyl-5-methylphenol in 60 ml. of glacial acetic acid there was added a solution of 20 grams of concentrated sulfuric acid in 40 ml. of glacial acetic acid. Formalin (4.2 ml.–0.056 mole HCHO) was added to the mixture, and then an additional 100 ml. of glacial acetic acid was added to produce a clear solution. The reaction mixture was allowed to stand 24 hours at room temperature, and then it was diluted with an equal volume of water. The resulting mixture was extracted with a mixture of petroleum ether and ether, the ether extract was thoroughly washed with water, and the extract was then dried over anhydrous potassium carbonate. The dried extract was filtered and evaporated to leave the dialkyl-phenol-formaldehyde reaction product as a light brown gum weighing 23 grams. The reaction product, upon testing in the manner of Example 1, is found to be a superior non-discoloring antioxidant for rubber.

EXAMPLE 3

A mixture of 2 moles (328 grams) of 2-tert-butyl-5-methylphenol, 1 mole (30 grams) of formaldehyde (as a 35% aqueous solution) and 0.2 mole of sodium hydroxide (as a 10% aqueous solution) was stirred for 15 hours at room temperature. The reaction mixture was then neutralized with acetic acid, and the neutralized mixture was extracted with benzene. The benzene extract was dried over anhydrous magnesium sulfate, and the benzene was then removed by distillation under reduced pressure. The reaction product remained as a viscous syrup weighing 351 grams.

The dialkylphenol-formaldehyde reaction product, prepared as in Example 3, was tested as a stabilizer or oxidation inhibitor for synthetic rubber by incorporating 2% by weight of the reaction product, based upon the synthetic rubber, into an unstabilized latex of GR–S (emulsion polymers of a 1,3-butadiene and emulsion copolymers of a 1,3-butadiene with styrene or a substituted styrene, the copolymers containing at least 50% combined butadiene or homolog thereof, all of which polymers have been and are being produced in United States Government-owned synthetic rubber plants). The resulting latex was coagulated in known manner to produce a synthetic rubber coagulum containing the stabilizer of the invention uniformly distributed therethrough. The coagulum was dried in an oven for 20 hours at 75° C., and its physical condition and color were noted. Then the dried coagulum was aged in an oven at 110° C. one day and any changes in physical condition and color noted. The antioxidant or stabilizer of the invention was compared to a commercial, secondary aromatic amine-type of antioxidant by carrying out the same steps of coagulating a GR–S latex containing 2% of the amine-type antioxidant, drying the coagulum, oven aging same, and noting physical properties as above. Also, unstabilized GR–S latex was carried through the same procedure to provide data on a "blank" control. The data or observations are set out in Table 2.

TABLE 2

*Stabilizer tests in GR–S*

| Stabilizer | After Drying 20 hrs. at 75° C. | After Aging One Day at 110° C. |
| --- | --- | --- |
| None (Blank Control) | Light brown but otherwise no change. | Light brown; somewhat hardened. |
| Amine-Type Antioxidant. | Bluish-gray but otherwise no change. | Brown; slightly set up. |
| Dialkylphenol-Aldehyde Reaction Product of Example 3. | Light pink but otherwise no change. | Light brownish-yellow; otherwise no change. |

The data in Table 2 show that the antioxidants of the invention are non-discoloring stabilizers or inhibitors for synthetic rubber of the GR–S type, even superior to a well-known commercial antioxidant of the amine-type.

The antioxidants of the invention are likewise effective as stabilizers or oxidation inhibitors for other vulcanizable synthetic rubbers produced by polymerizing or copolymerizing a 1,3-butadiene (including hydrocarbon homologs of butadiene) and/or a vinyl monomer other than a styrene, for example, acrylonitrile, methacrylonitrile, an ester of vinyl alcohol, an ester of acrylic or methacrylic acids, vinylpyridine, vinylcarbazole or other low molecular weight vinyl monomers. The antioxidants are of commercial value in the synthetic rubber known as GR–A (which is the United States Government designation of a rubbery copolymer of acrylonitrile and 1,3-butadiene, containing at least 50% of combined butadiene).

The antioxidant of Example 3 was also evaluated in a white GR–S vulcanizate of the following formula:

*White GR–S stock*

| Ingredients | Parts by Weight |
| --- | --- |
| GR–S containing 2% of dialkylphenol-aldehyde reaction product of Example 3 | 100.0 |
| Cumarone resin | 10.0 |
| Zinc oxide | 100.0 |
| Magnesium oxide | 8.0 |
| Titanium dioxide pigment | 30.0 |
| Ultramarine blue | 0.1 |
| Accelerator | 1.1 |
| Sulfur | 4.0 |
| Hydrocarbon wax | 2.0 |
| Total | 255.2 |

The reaction product of Example 3 was incorporated in the GR–S latex and the mixture was coagulated to provide the stabilized GR–S. The white stock prepared in accordance with the above formula was vulcanized by heating 30, 50 and 70 minutes at 300° F. The physical properties of the three cures of the vulcanizate were entirely equal to the properties of a control stock in which the amine-type antioxidant previously mentioned was substituted for the reaction product of Example 3. After both stocks were aged for 4 days in an oven at 100° C., properties of all cures of both stocks were still equal.

The two white GR–S stocks (the 50 minute cure of each) were then exposed to natural outdoor weathering (direct sunlight) in Akron, Ohio, for one month, side by side. The observations made upon the two stocks are set out in Table 3.

TABLE 3
Natural weathering of white GR–S vulcanizates

| Antioxidant | After 8 Days—Color | After One Month | |
| --- | --- | --- | --- |
| | | Color | Checking |
| Dialkylphenol - aldehyde product of Example 3. | No change | No change | None. |
| Amine-type antioxidant | Dark cream | Light tan | Slight. |

Thus it is seen that the antioxidants of the invention are valuable non-discoloring antioxidants and stabilizers for natural as well as vulcanizable synthetic rubbers, protecting both the unvulcanized polymers as well as the vulcanized rubbery compositions from deterioration due to oxygen, heat and sunlight, or other actinic light. Although the examples show the use of one and 2% of the antioxidant in the rubber, any relatively small proportion of the antioxidant may be employed, for example, 0.1 to 10% by weight of the rubber.

The vulcanized products of the invention may be obtained by vulcanizing with sulfur with or without an accelerator, vulcanizing without free sulfur but in the presence of any of the well-known sulfur-donors such as the phenol polysulfides and homologs thereof, the dithiocarbamates, as well as cross-linking agents such as dithiols, nitro- and nitroso-compounds, as are well known in the rubber art for vulcanizing a rubber. Any rubber, natural or synthetic capable of being vulcanized by any of the foregoing vulcanizing agents is contemplated.

What is claimed is:

1. A rubber composition resistant to deterioration, comprising vulcanized rubber containing a relatively small amount of the reaction product of 3 to 4 moles of formaldehyde and 6 moles of a dialkylphenol of the formula

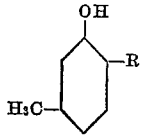

wherein R is a hydrocarbon radical containing 3 to 10 carbon atoms.

2. Method of making a rubber product resistant to deterioration, comprising vulcanizing rubber in the presence of a relatively small amount of the reaction product of 3 to 4 moles of acetaldehyde and 6 moles of a dialkylphenol of the formula

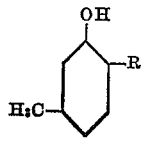

wherein R is a hydrocarbon radical containing 3 to 10 carbon atoms.

3. Vulcanized rubber containing a relatively small amount of the reaction product of 3 to 4 moles of formaldehyde and 6 moles of 2-tert-butyl-5-methylphenol.

4. Vulcanized rubber containing a relatively small amount of the reaction product of 3 to 4 moles of formaldehyde and 6 moles of 2-tert-octyl-5-methylphenol.

5. Vulcanized rubber containing a relatively small amount of the reaction product of 3 to 4 moles of acetaldehyde and 6 moles of 2-tert-butyl-5-methylphenol.

6. Vulcanizable rubber containing a relatively small amount of the reaction product of 3 to 4 moles of formaldehyde and 6 moles of 2-tert-butyl-5-methylphenol.

7. Vulcanizable rubber containing a relatively small amount of the reaction product of 3 to 4 moles of formaldehyde and 6 moles of 2-tert-octyl-5-methylphenol.

8. Vulcanizable rubber containing a relatively small amount of the reaction product of 3 to 4 moles of acetaldehyde and 6 moles of 2-tert-butyl-5-methylphenol.

9. Vulcanizable rubber containing a relatively small amount of the reaction product of 3 to 4 moles of an aliphatic aldehyde and 6 moles of a dialkylphenol of the formula

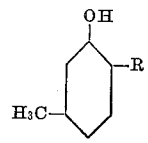

wherein R is a hydrocarbon radical containing 3 to 10 carbon atoms.

10. Method of protecting a vulcanizable rubber from deterioration without appreciable discoloration, comprising mixing with a latex of the rubber a relatively small amount of the reaction product of 3 to 4 moles of an aliphatic aldehyde and 6 moles of a dialkylphenol of the formula

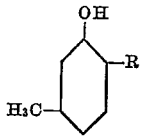

wherein R is a hydrocarbon radical containing 3 to 10 carbon atoms.

JOSEPH C. AMBELANG.

References Cited in the file of this patent

FOREIGN PATENTS

| Number | Country | Date |
| --- | --- | --- |
| 622,977 | Great Britain | May 10, 1949 |